US010987650B2

(12) United States Patent
Takahashi et al.

(10) Patent No.: US 10,987,650 B2
(45) Date of Patent: Apr. 27, 2021

(54) ADSORPTION FILTER

(71) Applicant: KURARAY CO., LTD., Kurashiki (JP)

(72) Inventors: Keita Takahashi, Okayama (JP); Takayuki Yoshikawa, Okayama (JP); Tetsuya Hanamoto, Okayama (JP); Hiroe Yoshinobu, Okayama (JP); Takayuki Yamada, Okayama (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 15/733,236

(22) PCT Filed: Dec. 18, 2018

(86) PCT No.: PCT/JP2018/046467
§ 371 (c)(1),
(2) Date: Jun. 15, 2020

(87) PCT Pub. No.: WO2019/131305
PCT Pub. Date: Jul. 4, 2019

(65) Prior Publication Data
US 2020/0398247 A1 Dec. 24, 2020

(30) Foreign Application Priority Data
Dec. 28, 2017 (JP) .............................. JP2017-254354

(51) Int. Cl.
*B01J 20/20* (2006.01)
*B01J 20/28* (2006.01)
*C02F 1/28* (2006.01)
*C02F 101/12* (2006.01)
*C02F 101/32* (2006.01)

(52) U.S. Cl.
CPC ........... *B01J 20/20* (2013.01); *B01J 20/2803* (2013.01); *B01J 20/28011* (2013.01); *B01J 20/28028* (2013.01); *B01J 20/28071* (2013.01); *B01J 20/28073* (2013.01); *B01J 20/28076* (2013.01); *B01J 20/28085* (2013.01); *C02F 1/283* (2013.01); *C02F 1/288* (2013.01); *C02F 2101/12* (2013.01); *C02F 2101/322* (2013.01); *C02F 2303/02* (2013.01); *C02F 2303/185* (2013.01)

(58) Field of Classification Search
CPC .............. B01J 20/28011; B01J 20/2803; B01J 20/28085

See application file for complete search history.

(56) References Cited

U.S. PATENT DOCUMENTS

| 5,039,651 | A | 8/1991 | Kosaka et al. |
|---|---|---|---|
| 5,118,329 | A | 6/1992 | Kosaka et al. |
| 6,353,528 | B1 * | 3/2002 | Hori ...................... C01B 32/382 361/502 |
| 6,702,875 | B2 * | 3/2004 | Jagtoyen ................... A61L 9/16 422/1 |
| 10,023,475 | B2 * | 7/2018 | Arita ................... B01J 20/28042 |
| 2018/0170760 | A1 | 6/2018 | Tsukazaki et al. |

FOREIGN PATENT DOCUMENTS

| JP | S62-230608 | 10/1987 |
|---|---|---|
| JP | H02-167809 | 6/1990 |
| JP | 2011-255310 | 12/2011 |
| JP | 2015-112518 | 6/2015 |
| JP | 2017-7879 | 1/2017 |
| WO | 2010/008072 | 1/2010 |

OTHER PUBLICATIONS

International Search Report dated Mar. 12, 2019 in PCT/JP2018/046467 with English translation, 4 pages.
Written Opinion dated Mar. 12, 2019 in PCT/JP2018/046467.

* cited by examiner

*Primary Examiner* — Stuart L Hendrickson
(74) *Attorney, Agent, or Firm* — Grüneberg and Myers PLLC

(57) ABSTRACT

One aspect of the present invention relates to an adsorption filter containing an activated carbon and a fibrous binder. The adsorption filter has a density of 0.400 g/ml or more, and a pore volume at a pore diameter of 1 to 20 μm is 0.60 ml/g or less as measured by mercury intrusion porosimetry.

7 Claims, 5 Drawing Sheets

ADSORPTION FILTER

TECHNICAL FIELD

The present invention relates to an adsorption filter containing an activated carbon.

BACKGROUND ART

In recent years, safety and hygienic concerns have increased with regard to water quality of tap water, and removal of harmful substances contained in tap water, such as free residual chlorine, VOC (volatile organic compounds) such as trihalomethanes, agricultural chemicals, and musty odors, is desired.

In particular, chlorine which is used in tap water or the like for preventing propagation of bacteria is not a nontoxic substance, and when hair or skin is washed with tap water having a high residual chlorine concentration, the protein of the hair or skin may be denatured and damaged. A slight amount of trihalomethane which is dissolved in tap water is suspected to be a carcinogenic substance. In recent years, with enhanced health trend, removal of trihalomethane and the like is desired.

Hitherto, in order to remove these harmful substances, an adsorption molded body obtained by entangling a fibrillated fibrous binder with a granular activated carbon is used as a filter.

For example, Patent Literature 1 discloses a molded adsorption body in which a filter material mainly composed of an activated carbon is molded with a fibrous binder, wherein the activated carbon is fine-particle activated carbon having a volume-based mode diameter of 20 μm or more and 100 μm or less, and the fibrous binder is mainly composed of a fiber material having a freeness of 20 mL or more and 100 mL or less by fibrillation.

When a powdery activated carbon having a small particle diameter is molded with a fibrous binder having a low freeness as in the molded adsorption body disclosed in Patent Literature 1, the moldability is improved, and also a filter having high adsorption performance and stable quality is obtained. However, a problem has been found that, when a fine powder activated carbon is included in the filter, an increase in pressure loss occurs in addition to a decrease in molded body strength, and moreover, clogging of the filter is apt to occur. If clogging occurs, problems arise such as not being capable of obtaining a sufficient water flow rate, breakage caused by a load of water pressure imposed on the filter, and outflow of water not purified yet or a filter material from a broken site.

Therefore, there is a demand for an adsorption filter retaining excellent filtration capability to remove harmful substances, being less likely to cause clogging, and composed of a powdery activated carbon and a binder.

CITATION LIST

Patent Literature

Patent Literature 1: Japanese Unexamined Patent Publication No. 2011-255310

SUMMARY OF INVENTION

The present inventors have conducted detailed studies on an adsorption filter and a method for producing the same in order to solve the problems, and as a result, have found that the problems can be solved by the following configuration, and have completed the present invention by further studying based on this finding.

That is, an adsorption filter according to one aspect of the present invention is an adsorption filter including an activated carbon and a fibrous binder, wherein the adsorption filter has a density of 0.400 g/ml or more, and a pore volume at a pore diameter of 1 to 20 μm is 0.60 ml/g or less as measured by mercury intrusion porosimetry.

DESCRIPTION OF EMBODIMENTS

Figure 1:
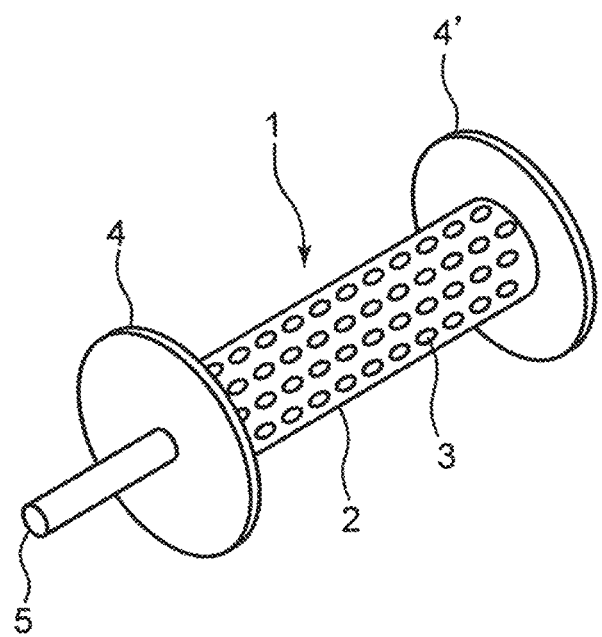
FIG. 1 shows a perspective view of a mold for preparing an adsorption filter of the present embodiment.
Figure 2:
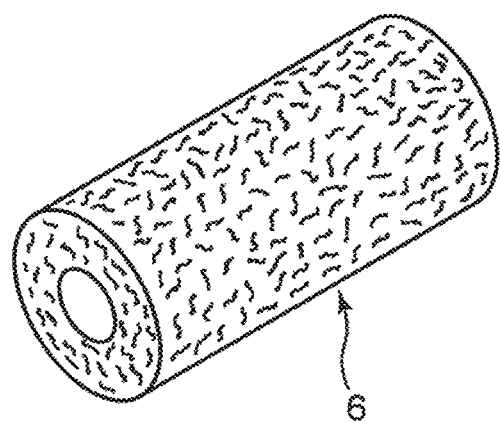
FIG. 2 is a perspective view showing an example of the adsorption filter of the present embodiment obtained using the mold of FIG. 1.

Hereinafter, embodiments according to the present invention will be specifically described, but the present invention is not limited thereto.

(Adsorption Filter)

An adsorption filter of the present embodiment includes an activated carbon and a fibrous binder, wherein the adsorption filter has a density of 0.400 g/ml or more, and a pore volume at a pore diameter of 1 to 20 μm is 0.60 ml/g or less as measured by mercury intrusion porosimetry.

Such a configuration can provide an adsorption filter having an excellent water-passing property and high adsorption performance, in particular, having excellent filtration capability to remove harmful substances such as chloroform and being less likely to cause clogging.

This is considered to be because the density of the filter can be increased to improve the adsorption performance of the harmful substances by the adsorption filter, and the volume of the pores each having a specific pore diameter can be reduced to being less likely to cause clogging.

The density of the adsorption filter of the present embodiment is 0.400 g/ml or more. When the density is less than 0.400 g/ml, the total amount of the activated carbon is reduced, to cause deteriorated adsorption performance of the harmful substances. More preferably, the density is 0.420 g/ml or more. Meanwhile, the upper limit of the density of the adsorption filter is not particularly limited. However, if the density is too high, the clogging of the adsorption filter may be apt to occur. Therefore, the density of the adsorption filter of the present embodiment is preferably 0.550 g/ml or less.

In the present embodiment, the density of the adsorption filter can be measured by a method described in Examples to be described later.

In the adsorption filter of the present embodiment, a pore volume at a pore diameter of 1 to 20 μm is 0.60 m/g or less as measured by mercury intrusion porosimetry. If the pore volume is more than 0.60 ml/g, the pores are filled with a suspended substance, and blocked, resulting in clogging. The pore volume is more preferably 0.55 ml/g or less, and still more preferably 0.50 ml/g or less. Meanwhile, the lower limit of the pore volume is not particularly limited. However, in an adsorption filter having a too small pore volume, the density of the activated carbon of the filter tends to decrease, so that the adsorption performance of the harmful substances may be deteriorated. Therefore, the pore volume is preferably 0.10 ml/g or more.

In the present embodiment, the pore volume can be measured by mercury intrusion porosimetry using a mercury intrusion porosimetry pore volume measuring device ("MicroActive AutoPore V 9620") manufactured by Micromeritics Instrument Corporation) as in Examples to be described later. In Examples to be described later, the formed layer of the filter is a measurement sample having a size of about 1 cm square, but it is preferable that the size of the measurement sample is appropriately changed depending on a filter size. For example, in a spout-in type filter, it is desirable to measure a measurement sample of about 5 mm square.

Furthermore, in the adsorption filter of the present embodiment, it is preferable that a ratio of a pore volume at a pore diameter of 1 to 20 μm as measured by mercury intrusion porosimetry to the pore volume at a pore diameter of 30 μm or more as measured by mercury intrusion porosimetry (the pore volume at a pore diameter of 1 to 20 μm/the pore volume at a pore diameter of 30 μm or more) is 0.1 to 1.5. If the ratio between the relatively small pores and the relatively large pores is within such a range, clogging due to the filling of the pores with the suspended substance can be further suppressed, and the adsorption performance of the harmful substances can further improved advantageously. More preferably, the range of the pore volume at a pore diameter of 1 to 20 μm/the pore volume at a pore diameter of 30 μm or more is desirably 0.2 to 1.0.

In the adsorption filter of the present embodiment, a pore volume at a pore diameter of 30 μm or more is preferably 0.40 to 1.0 ml/g as measured by mercury intrusion porosimetry, and more preferably 0.50 to 0.90 ml/g. If the pore volume is too small, the volume for causing the suspended substance to flow becomes insufficient, which is apt to cause clogging. If the pore volume is too large, the density of the above-described adsorption filter becomes small, which may cause deteriorated adsorption performance of the harmful substances.

Furthermore, the adsorption filter of the present embodiment preferably has benzene adsorption performance of about 18 to 35%, more preferably about 20 to 35%, and still more preferably about 22 to 30%. If the benzene adsorption performance is less than 18%, it may not be possible to retain sufficient adsorption capacity. If the benzene adsorption performance exceeds 35%, the pore size increases in an overactivated state, which tends to cause a reduced adsorption retention force of the harmful substances. Therefore, in the adsorption filter of the present embodiment, it is preferable that the benzene adsorption performance is within the above range.

In the present embodiment, with reference to the description of JIS K 1474 (1991) which is an activated carbon test method in Japanese Industrial Standards, the benzene adsorption performance means a benzene saturation adsorption amount obtained from a weight increase of a sample when air containing solvent vapor having a concentration of $\frac{1}{10}$ of a solvent saturation concentration is caused to pass through the adsorption filter at 25° C., and a mass is constant.

The activated carbon used in the adsorption filter of the present embodiment is not particularly limited, and a commercially available activated carbon can be used. For example, the activated carbon obtained by carbonizing and/or activating a carbonaceous material can also be used. When the carbonization is necessary, the carbonization may be typically performed, for example, at a temperature of about 400 to 800° C., preferably about 500 to 800° C., and more preferably about 550 to 750° C., in the absence of oxygen or air. As the activation method, any of a gas activation method and a chemical activation method may be adopted. The gas activation method and the chemical activation method may be used in combination. In particular, when the filter is used for purification of water, the gas activation method is preferable because of leaving a less amount of residual impurities. The gas activation method may be typically performed, for example, by causing a carbonized carbonaceous material to react with an activation gas (for example, water vapor, carbon dioxide gas, or the like) at a temperature of about 700 to 1100° C., preferably about 800 to 980° C., and more preferably about 850 to 950° C. In consideration of safety and reactivity, the activation gas is preferably a water-vapor-containing gas containing 10 to 40% by volume of water vapor. The activation time and temperature-raising speed are not particularly limited and can be appropriately selected depending on the kind, shape, and size of a carbonaceous material to be selected.

The carbonaceous material is not particularly limited. Examples of the carbonaceous material include plant-series carbonaceous materials (for example, materials derived from plants, such as wood, sawdust, charcoal, fruit shell such as coconut shell or walnut shell, fruit seed, by-product of pulp production, lignin, and waste molasses), mineral-series carbonaceous materials (for example, materials derived from minerals, such as peat, lignite, brown coal, bituminous coal, anthracite coal, coke, coal tar, coal tar pitch, petroleum distillation residue, and petroleum pitch), synthetic resin-series carbonaceous materials (for example, materials derived from synthetic resins, such as a phenolic resin, polyvinylidene chloride, and an acrylic resin), and natural fiber-series carbonaceous materials (for example, materials derived from natural fibers, such as natural fiber (e.g., cellulose) and regenerated fiber (e.g., rayon)). These carbonaceous materials may be used alone or in combination of two or more. Among these carbonaceous materials, coconut shell or a phenolic resin is preferred in view of the fact that such a material easily forms micropores which are involved in the adsorption performance of volatile organic compounds defined in JIS S3201 (2010).

After activation, the activated carbon may be washed for removing ash components or chemical agents, particularly when a plant-series carbonaceous material such as coconut shell or a mineral-series carbonaceous material is used. For the washing, a mineral acid or water is used. The mineral acid is preferably hydrochloric acid having high washing efficiency.

The shape of the activated carbon of the present embodiment may be any shape such as a powder shape, a particle shape or a fiber shape (thread shape, woven cloth (cloth) shape, felt shape), and can be appropriately selected in accordance with the purpose of use. However, the particle shape providing high adsorption performance per volume is preferable.

The particle diameter of the activated carbon of the present embodiment is not particularly limited. However, the 50% particle diameter (D50) in the cumulative particle size distribution at volume standard is about 50 to 200 μm, more preferably about 100 to 170 μm, and more preferably about 130 to 150 μm. If the particle diameter of the activated carbon is within such a range, an adsorption filter having adsorption removal performance, and being less likely to cause clogging is likely to be obtained.

The particle diameter of the activated carbon of the present embodiment is not particularly limited. However, the 10% particle diameter (D10) in the cumulative particle size distribution at volume standard is preferably about 30 to 100 μm, more preferably about 40 to 90 p and still more preferably about 50 to 80 μm. If the particle diameter of the activated carbon is within such a range, an adsorption filter having adsorption removal performance, and being less likely to cause clogging is likely to be obtained.

The particle diameter of the activated carbon of the present embodiment is not particularly limited. However, the 90% particle diameter (D90) in the cumulative particle size distribution at volume standard is preferably about 160 to 240 μm, more preferably about 170 to 230 μm, and still more preferably about 180 to 220 μm. If the particle diameter of the activated carbon is within such a range, an adsorption filter having adsorption removal performance, and being less likely to cause clogging is likely to be obtained.

In the present embodiment, the numerical values of D50, D10, and D90 are values measured by a laser diffraction-scattering method, and can be measured, for example, with a wet particle size distribution measuring device (MICROTRAC MT3300EX II) manufactured by Nikkiso Co., Ltd. or the like.

The fibrous binder used in the adsorption filter of the present embodiment is not particularly limited as long as the granular activated carbon can be entangled and shaped, so that a wide variety of binders including synthetic binders and natural binders can be used. Examples of such binders include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

These fibrous binders may be used in combination of two or more. Particularly preferably, a polyacrylonitrile fiber or pulp is used as the binder. This can further increase the molded body density and the molded body strength to suppress deterioration in the performance.

In the present embodiment, the water-passing property of the fibrous polymer binder is about 10 to 150 mL in terms of a CSF value. In the present embodiment, the CSF value is a value obtained by measurement in accordance with JIS P8121 (2012) "Pulps-Determination of Drainability" Canadian Standard Freeness method. The CSF value can be adjusted, for example, by fibrillating the binder.

When the CSF value of the fibrous polymer binder is less than 10 mL, the water-passing property is not obtained, so that the strength of the molded body may decrease, and also the pressure loss may increase. Meanwhile, when the CSF value exceeds 150 mL, the powdery activated carbon cannot be sufficiently retained, so that the strength of the molded body may decrease, and also the filter may have poor adsorption performance.

The adsorption filter of the embodiment may contain functional components other than the above as long as the effects of the present invention are not inhibited. For example, a zeolite-based powder (lead adsorption material), an ion-exchange resin, or a chelate resin capable of removing soluble lead by adsorption, or various kinds of adsorption materials containing a silver ion and/or a silver compound for imparting antimicrobial property, or the like may be added in arbitrary amounts. However, these are typically blended at 0.1 to 30 parts by mass based on the whole adsorption filter.

The mixing ratio of each component in the adsorption filter of the present embodiment is preferably set such that the fibrous binder is contained at about 4 to 10 parts by mass based on 100 parts by mass of the activated carbon or the mixture of the activated carbon and the functional components in view of the effect of adsorbing the harmful substances, the moldability, and the like. When the amount of the fibrous binder is less than 4 parts by mass, sufficient strength may not be obtained, to cause a fear that the molded body cannot be molded. When the amount of the fibrous binder exceeds 10 parts by mass, the adsorption performance may be deteriorated. More preferably, the fibrous binder is desirably blended at 4.5 to 6 parts by mass.

The adsorption filter of the present embodiment may be a cylindrical filter further including a core in addition to the activated carbon and the fibrous binder. By making the adsorption filter into a cylindrical shape, the water flow resistance can be lowered. Furthermore, when the adsorption filter is filled in the housing for use as a cartridge as described later, it is possible to easily mount and replace the cartridge in a water purifier as an advantage.

The core which can be used in the present embodiment is not particularly limited as long as it can be inserted into a hollow portion of the cylindrical filter to reinforce the cylindrical filter. However, it is preferably, for example, a trical pipe, a netron pipe, or a ceramic filter. Furthermore, the core can also be used in a state where a nonwoven fabric or the like is wound around the outer periphery of the core.

(Production Method)

Production of the adsorption filter of the present embodiment is performed by an arbitrary method, and is not particularly limited. A slurry suction method is preferable in that the adsorption filter can be efficiently produced.

Hereinafter, as an example, the method for producing the cylindrical filter of the present embodiment will be described in detail with reference to the drawings and the like. However, the present invention is not limited thereto. In the drawings, each of symbols indicates the following:

1: mold for preparing molded body
2: core body
3: suction hole
4, 4': flange
5: filtrate discharge port
6: molded body
7: slurry
8: bench
9: pressing tool Specifically, for example, a cylindrical filter (molded body) can be obtained by a production method which includes a slurry preparation step of preparing a slurry by dispersing the powdery activated carbon and the fibrous binder in water; a suction filtration step of filtering the slurry while performing suction to obtain a preform; a rolling step of adjusting the shape of an outer surface of the preform after the suction filtration by compressing the preform on a shaping bench; a drying step of drying the preform to obtain a dried molded body; and a grinding step of grinding an outer surface of the molded body if necessary.

(Slurry Preparation Step)

In the present embodiment, in the slurry preparation step, for example, a slurry is prepared in which the powdery activated carbon and the fibrous binder are dispersed in a solvent so that the slurry contains 4 to 8 parts by mass of the fibrous binder based on 100 parts by mass of the activated carbon and has a solid content concentration of 0.1 to 10% by mass (particularly preferably 1 to 5% by mass). The solvent is not particularly limited. However, water or the like is preferably used. If the solid content concentration of the slurry is too high, the dispersion is apt to be nonuniform, so that mottles are apt to be disadvantageously generated in the molded body. Meanwhile, if the solid content concentration is too low, the molding time is prolonged to not only lower the productivity, but also to increase the density of the molded body, so that clogging is apt to occur due to trapping of the turbidity components.

(Suction Filtration Step)

Figure 3:
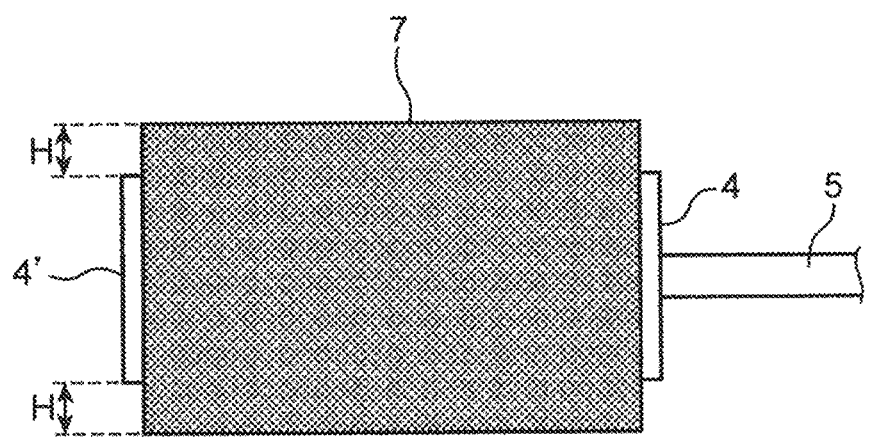
FIG. 3 shows an example of a preform obtained by suction-filtering a slurry for adsorption filter using the mold shown in FIG. 1.

Next, in the suction filtration step, for example, as shown in FIG. 1, to a cylindrical molding mold 1 having a large number of suction holes 3 in the surface of a core body 2 and having flanges 4, 4' attached to both ends, the above-described core is attached. The mold 1 is put into the slurry, and the slurry is adhered to the mold 1 by filtering the slurry from the inside of the mold via a filtrate discharge port 5 while suctioning the slurry. As the suction method, a conventional method, for example, a method for performing suction using a suction pump or the like can be utilized. As shown in FIG. 3, the slurry is adhered to the mold 1 in such an amount that R+(H×2) is about 105 to 125% with respect to the diameter R of the flanges 4 and 4' of the mold 1. For example, it is preferable that, when the diameter of the flange is 65 mm, the H is about 2 to 9 mm.

(Rolling Step)

Figure 4:
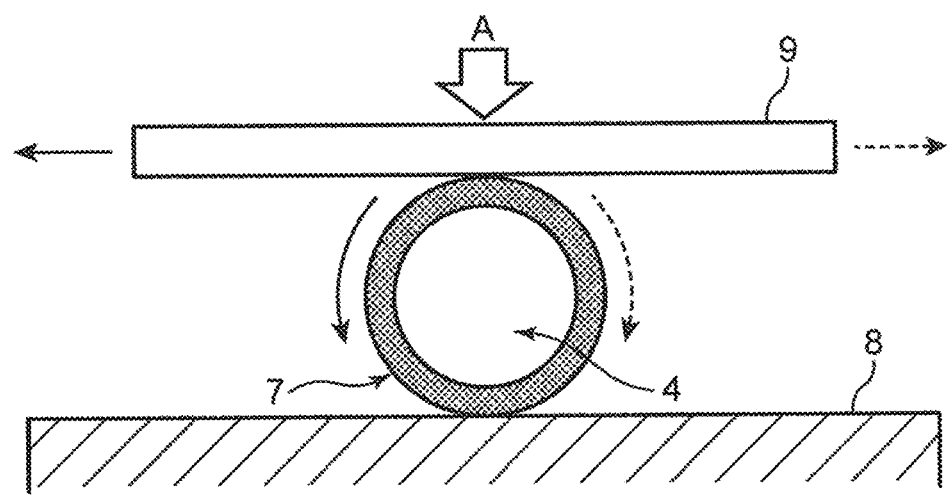
FIG. 4 is a diagram for illustrating a step of rolling the preform obtained by suction-filtering on a flat surface.

In the rolling step, the mold 1 is placed on a bench 8 as shown in FIG. 4 in a state where the preform obtained in the suction filtration step is adhered. By using a pressing tool 9 having a surface which can press with a predetermined force, the preform is moved back and forth while being pressed in an A direction. Thus, while the outer diameter of the preform 7 is adjusted to a predetermined size, the roundness is increased and the irregularities of the outer peripheral surface are reduced. The outer diameter of the preform is preferably adjusted while the preform is pressed by the pressing tool 9 until the outer periphery of the flanges 4, 4' comes into contact with the bench 8. After rolling, the preform is removed from the mold.

The suction filtration step and the rolling step may be performed several times in order to obtain the target filter density and pore volume.

(Drying Step)

The preform is generated in the suction filtration and the rolling step. Then, the flanges 4, 4' at both ends of the mold 1 are removed, and the core body 2 is removed, whereby a hollow cylindrical molded body can be obtained.

Next, in the drying step, the preform removed from the mold can be dried by a drier or the like to obtain a molded body (an adsorption filter of the present embodiment).

The drying temperature is, for example, about 100 to 150° C. (particularly about 110 to 130° C.). The drying time is, for example, about 4 to 24 hours (particularly about 8 to 16 hours). If the drying temperature is too high, degeneration or melting of the fibrous binder occurs, so that the molded body is apt to have low filtration performance or low strength. If the drying temperature is too low, the drying time may be prolonged, or the drying may become insufficient.

(Grinding Step)

If necessary, a grinding step may be performed after the drying step to further adjust the outer diameter of the filter or to reduce the irregularities of the outer peripheral surface. The grinding means used in the present embodiment is not particularly limited as long as an outer surface of the dried molded body can be ground (or polished), and a conventional grinding method may be used. However, from the viewpoint of uniform grinding, a method is preferable, in which a grinding machine grinding the molded body by rotating the molded body itself is used.

The grinding step is not limited to the method using a grinding machine. For example, the molded body fixed to the rotation shaft may be ground by a fixed plate-shaped grindstone. In this method, since the generated grinding shavings are apt to accumulate on the ground surface, the grinding with air blowing is effective.

(Use of Adsorption Filter, or the Like)

The adsorption filter of the present embodiment is used, for example, as a water-purifying filter, an artificial dialysis filter, or the like. When the adsorption filter is used as a water-purifying filter or an artificial dialysis filter, the water-purifying filter or the artificial dialysis filter may be obtained, for example, by producing the adsorption filter of the present embodiment according to the above-described production method, then neatening and drying the adsorption filter, and thereafter cutting the adsorption filter into a desired size and shape. Furthermore, if necessary, a cap may be attached to the tip portion, or a nonwoven fabric may be attached to the surface.

The adsorption filter of the present embodiment can be used as a cartridge for water purification by filling a housing therewith. The cartridge is mounted in a water purifier to be subjected to water passing. As a water-passing method, a total filtration method in which a whole amount of raw water is filtered or a circulation filtration method is adopted. In the present embodiment, the cartridge mounted in the water purifier may be used, for example, by filling a housing with the water-purifying filter. However, the cartridge may be used by being further combined with known nonwoven fabric filters, various kinds of adsorption materials, mineral additive materials, ceramic filtering materials, and the like.

As described above, the present specification discloses techniques of various aspects, among which main techniques are summarized below.

The adsorption filter according to one aspect of the present invention is an adsorption filter including an activated carbon and a fibrous binder, wherein the adsorption filter has a density of 0.400 g/ml or more, and a pore volume at a pore diameter of 1 to 20 μm is 0.60 ml/g or less as measured by mercury intrusion porosimetry.

Such a configuration can provide an adsorption filter retaining excellent filtration capability to remove harmful substances, being less likely to cause clogging, and composed of a powdery activated carbon and a binder.

Furthermore, in the adsorption filter, it is preferable that, when air containing solvent vapor having a concentration of 1/10 of a solvent saturation concentration is caused to pass through the adsorption filter at 25° C., and a mass is constant, a benzene saturation adsorption amount obtained from a weight increase of a sample is 18 to 35%. Thereby, it is considered that excellent filtration capability to remove harmful substances can be more reliably obtained.

In the adsorption filter, it is preferable that a ratio of a pore volume at a pore diameter of 1 to 20 μm as measured by mercury intrusion porosimetry to the pore volume at a pore diameter of 30 μm or more as measured by mercury intrusion porosimetry (the pore volume at a pore diameter of 1 to 20 μm/the pore volume at a pore diameter of 30 μm or more) is 0.1 to 1.5. Thereby, the above-described effects can be more reliably obtained.

EXAMPLES

Hereinafter, the present invention will be described in more detail based on Examples, but these Examples do not limit the present invention at all.

First, methods for evaluating an activated carbon and an adsorption filter prepared in each of Examples and Comparative Examples will be described.

[Measurement of Particle Size of Activated Carbon] The particle sizes (D10, D50, D90) of the activated carbon were measured by a laser diffraction measurement method. That is, the activated carbon to be measured was placed in ion exchange water together with a surfactant, subjected to ultrasonic vibration to prepare a homogeneous dispersion, and the dispersion was measured using Microtrac MT 3300 EX-II manufactured by MicrotracBEL Corp. "Polyoxyethylene (10) octylphenyl ether" manufactured by Wako Pure Chemical Industries, Ltd. was used as the surfactant. The analysis conditions are shown below.

(Analysis Conditions)

Number of measurements; average value of three measurements

Measurement time; 30 seconds

Distribution representation; volume

Particle size division; standard

Calculation mode; MT 3000 II

Solvent name; WATER

Measurement upper limit; 2000 μm and measurement lower limit; 0.021 μm

Residual fraction ratio; 0.00

Passing fraction ratio; 0.00

Residual fraction ratio setting; invalid

Particle transmittance; absorption

Particle refractive index; N/A

Particle shape; N/A

Solvent refractive index; 1.333

DV value; 0.0882

Transmittance (TR); 0.800 to 0.930

Extension filter; invalid

Flow rate; 70%

Supersonic wave output; 40 W

Supersonic wave time; 180 seconds

[Measurement of Density of Adsorption Filter]

The density (g/ml) of the cylindrical adsorption filter was calculated according to the following equation after drying the obtained adsorption filter at 120° C. for 2 hours. The density of the cylindrical adsorption filter refers to the density of only the formed layer of the activated carbon and the fibrous binder.

Density of Cylindrical Adsorption Filter=(Weight of Cylindrical Adsorption Filter)/(Volume of Cylindrical Adsorption Filter)

[Measurement of Pore Volume of Adsorption Filter]

Figure 5:
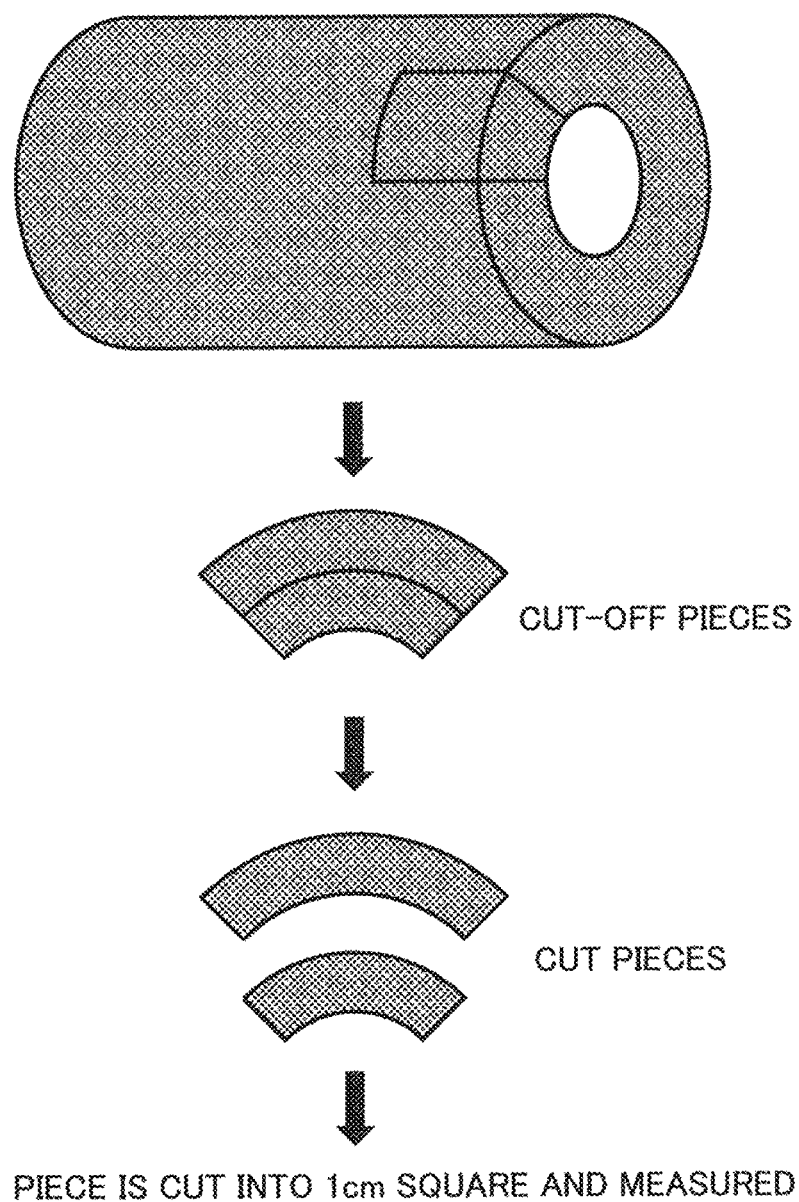
FIG. 5 is a diagram for illustrating a method for cutting out a measurement sample when measuring the pore volume of the adsorption filter.

The pore volume of the cylindrical adsorption filter was measured by using a mercury intrusion porosimetry pore volume measuring device ("MicroActive AutoPore V 9620" manufactured by Micromeritics Instrument Corporation). The measurement pressure was 0.7 kPa to 420 MPa. The formed layer composed of the activated carbon and the fibrous binder of the cylindrical adsorption filter was cut as shown in FIG. 5, and the cut piece was then equally cut (thickness direction: ½ in a direction perpendicular to the cross section of the filter). The cut piece was further cut into a size of about 1 cm square, and measured. For each of two samples obtained by cutting, the pore volume having a pore diameter of 1 to 20 μm and the pore volume having a pore diameter of 30 μm or more were calculated, and averaged.

A ratio of a pore volume at a pore diameter of 1 to 20 μm to the pore volume at a pore diameter of 30 μm or more (the pore volume at a pore diameter of 1 to 20 μm/the pore volume at a pore diameter of 30 μm or more) was calculated.

The results of the pore volume at a pore diameter of 1 to 20 μm and the pore volume at a pore diameter of 1 to 20 μm/the pore volume at a pore diameter of 30 μm or more (small pore volume/large pore volume) are shown in the Table 2.

[Measurement of Benzene Adsorption Performance of Adsorption Filter]

With reference to JIS K 1474 (1991) which was an activated carbon test method in Japanese Industrial Standards, a benzene saturation adsorption amount was obtained from a weight increase of a sample when air containing solvent vapor having a concentration of ⅒ of a solvent saturation concentration was caused to pass through the adsorption filter at 25° C., and a mass was constant. A measurement sample to be used was obtained by cutting a part of a cylindrical adsorption filter and pulverizing it, and the adsorption performance of the sample after pulverization was evaluated.

Furthermore, with respect to the obtained cylindrical adsorption filter, turbidity component removal performance and chloroform removal performance were evaluated by the following methods. These methods are based on the turbidity component removal performance test (6.2.2) and the volatile organic compound removal performance test (6.2.3) of JISS3201 (2010)(domestic water purifier testing method).

[Clogging Performance (Turbidity Component Removal Performance) Test]

Test water was prepared by adding kaolin to raw water (tap water) so as to have a concentration of two degrees. The test water was caused to flow from the outside to the inside of the cylindrical adsorption filter at an initial flow rate of 4.0 L/min under a pressure condition of 0.1 MPa. An accumulated water-passing amount when a passing water volume reached 50% of an initial flow rate was evaluated as turbidity component removal performance. In the evaluation test, 20,000 L or more was regarded as acceptance criterion in clogging performance.

[Chloroform (Harmful Substance) Removal Performance]

Test water having a chloroform concentration of 60 ppb was caused to flow at a flow rate of 4.0 L/min from the outside to the inside of the cylindrical adsorption filter under a pressure condition of 0.1 MPa. An accumulated water-passing amount when the chloroform removal rate was less than 80% was evaluated as chloroform removal performance. In the evaluation test, 8000 L or more was regarded as acceptance criterion of harmful substance removal performance.

Example 1

[Raw Material for Adsorption Filter]

(Activated Carbon A)

A method for preparing an activated carbon used as a raw material is as follows:

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 32 wt %). The obtained granular activated carbon was pulverized with a ball mill, and then classified with a 325-mesh sieve to obtain a powdery activated carbon A having a D50 value of 140.9 μm.

(Fibrous Binder)

Acrylic fibrous binder: "acrylic fiber Bi-PUL/F" manufactured by Japan Exlan Co., Ltd, CSF value: 90 ml (Core)

Trical pipe, manufactured by C.I. TAKIRON Corporation

[Production of Adsorption Filter]

Tap water was added to a total of 1.055 kg of 100 parts by mass of the powdery activated carbon A and 5.5 parts by mass of a fibrous binder, to set the amount of a slurry to 20 L.

Next, a trical pipe (outer diameter: 35 mmφ, inner diameter: 30.5 mmφ, height: 245 mmH) wound with a cylindrical nonwoven fabric was attached to a mold having a large number of pores with a diameter of 3 mm, an outer diameter of 63 mmφ, an inner shaft diameter of 30 mmφ and a height of 245 mmH, and the obtained slurry was suctioned at 450 mmHg until the outer diameter of a preform formed of the slurry was 73 mmφ. Thereafter, the surface of the obtained preform was rollingly formed until the outer diameter was 63 mmφ, and dried to obtain a hollow cylindrical adsorption filter having an outer diameter of 63 mmφ, an inner diameter of 35 mm and a height of 245 mmH. The density and benzene adsorption performance of the obtained adsorption filter, the pore volume at a pore diameter of 1 to 20 μm as obtained by mercury porosimetry measurement, and the pore volume at a diameter of 1 to 20 μm/the pore volume at a diameter of 30 μm or more are shown in Table 2 below.

This adsorption filter was mounted in a transparent plastic housing having an average diameter of 79 mm, a length of 250 mm, and an internal presence amount of 1200 ml, and water was passed from the outside to the inside. In accordance with the domestic water purifier testing method, turbidity component removal performance and chloroform removal performance were evaluated. The results are shown in Table 2.

Comparative Example 1

A cylindrical adsorption filter was prepared in the same manner as in Example 1 except that an outer diameter of the cylindrical adsorption filter after suction of a slurry was set to 65 mmφ. Table 2 shows the results of each evaluation test.

Comparative Example 2

[Raw Material for Adsorption Filter]

(Activated Carbon B)

A granular activated carbon of Example 1 (JISK1474, 18×42 mesh, benzene adsorption amount: 32 wt %) was pulverized with a ball mill so that a D50 value was 114.3 μm, to obtain a powdery activated carbon B.

A cylindrical adsorption filter was prepared in the same manner as in Comparative Example 1 except that an activated carbon to be used was changed to a powdery activated carbon B. Table 2 shows the results of each evaluation test.

Comparative Example 3

A cylindrical adsorption filter was prepared in the same manner as in Example 1 except that an activated carbon to be used was changed to a powdery activated carbon B. Table 2 shows the results of each evaluation test.

Example 2

[Raw Material for Adsorption Filter]

(Activated Carbon C)

A method for preparing an activated carbon used as a raw material is as follows:

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 21 wt %). The obtained granular activated carbon was pulverized with a ball mill, and then classified with a 200-mesh sieve to obtain a powdery activated carbon C having a D50 value of 147.6 μm.

A cylindrical adsorption filter was prepared in the same manner as in Example 1 except that an activated carbon to be used was changed to a powdery activated carbon C. Table 2 shows the results of each evaluation test.

Comparative Example 4

[Raw Material for Adsorption Filter]

A method for preparing an activated carbon used as a raw material is as follows:

(Activated Carbon D)

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 39 wt %). The obtained granular activated carbon was pulverized with a ball mill, and then classified with a 325-mesh sieve to obtain a powdery activated carbon D having a D50 value of 142.1 μm.

A cylindrical adsorption filter was prepared in the same manner as in Example 1 except that an activated carbon to be used was changed to a powdery activated carbon D. Table 2 shows the results of each evaluation test.

Example 3

A cylindrical adsorption filter was prepared in the same manner as in Example 1 except that an outer diameter of the cylindrical adsorption filter after suction of a slurry was set to 68 mmφ. Table 2 shows the results of each evaluation test.

Example 4

[Raw Material for Adsorption Filter]

(Activated Carbon E)

A method for preparing an activated carbon used as a raw material is as follows:

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 32 wt %). The obtained granular activated carbon was pulverized with a ball mill, and then classified with a 325-mesh sieve to obtain a powdery activated carbon E having a D50 value of 123.5 μm.

A cylindrical adsorption filter was prepared in the same manner as in Example 3 except that an activated carbon to be used was changed to a powdery activated carbon E. Table 2 shows the results of each evaluation test.

Example 5

A cylindrical adsorption filter was prepared in the same manner as in Example 1 except that an activated carbon to be used was changed to a powdery activated carbon E. Table 2 shows the results of each evaluation test.

Example 6

[Raw Material for Adsorption Filter]
(Activated Carbon F)
A method for preparing an activated carbon used as a raw material is as follows:

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 32 wt %). The obtained granular activated carbon was pulverized with a ball mill, and then classified with a 325-mesh sieve to obtain a powdery activated carbon F having a D50 value of 123.0 μm.

A cylindrical adsorption filter was prepared in the same manner as in Example 3 except that an activated carbon to be used was changed to a powdery activated carbon F. Table 2 shows the results of each evaluation test.

Comparative Example 5

A cylindrical adsorption filter was prepared in the same manner as in Example 1 except that an activated carbon to be used was changed to a powdery activated carbon F. Table 2 shows the results of each evaluation test.

Example 7

[Raw Material for Adsorption Filter]
(Activated Carbon G)
A method for preparing an activated carbon used as a raw material is as follows:

Coconut shell carbon obtained by carbonizing Philippine coconut shell was activated by steam at 900° C., and an activation time was adjusted so as to achieve the target benzene adsorption amount. The obtained coconut shell activated carbon was washed with diluted hydrochloric acid and demineralized with ion-exchanged water, to obtain a granular activated carbon (JISK1474, 18×42 mesh, benzene adsorption amount: 35 wt %). The obtained granular activated carbon was pulverized with a ball mill, and then classified with a 325-mesh sieve to obtain a powdery activated carbon G having a D50 value of 145.0 μm.

A cylindrical adsorption filter was prepared in the same manner as in Example 1 except that an activated carbon to be used was changed to a powdery activated carbon G. Table 2 shows the results of each evaluation test.

Table 1 summarizes D10, D50, and D90 of each of the activated carbons A to G.

TABLE 1

| | Particle size | | |
|---|---|---|---|
| | Physical properties of activated carbon | | |
| Activated carbon | D10 μm | D50 μm | D90 μm |
| Powdery activated carbon A | 73.6 | 140.9 | 212.2 |
| Powdery activated carbon B | 36.4 | 114.3 | 200.6 |
| Powdery activated carbon C | 86.0 | 147.6 | 222.4 |
| Powdery activated carbon D | 68.8 | 142.1 | 212.5 |
| Powdery activated carbon E | 53.3 | 123.5 | 189.4 |
| Powdery activated carbon F | 30.5 | 123.0 | 206.3 |
| Powdery activated carbon G | 74.1 | 145.0 | 211.9 |

TABLE 2

| | | Physical properties of adsorption filter | | | | Performance of adsorption filter | |
|---|---|---|---|---|---|---|---|
| | | | Mercury porosimetry | | | Clogging performance | Harmful substance removal performance |
| | Activated carbon | Density (g/ml) | Pore volume at diameter of 1 to 20 μm (ml/g) | Small pore volume/large pore volume | Benzene adsorption performance (%) | Accumulated water-passing amount when flow rate is 50% (L) | Accumulated water-passing amount when removal rate is 80% (L) |
| Example 1 | Powdery activated carbon A | 0.456 | 0.30 | 0.44 | 28.0 | 40980 | 9490 |
| Comparative Example 1 | Powdery activated carbon A | 0.387 | 0.29 | 0.28 | 27.9 | 61820 | 6570 |
| Comparative Example 2 | Powdery activated carbon B | 0.400 | 0.64 | 1.85 | 27.5 | 18380 | 8160 |
| Comparative Example 3 | Powdery activated carbon B | 0.467 | 0.61 | 2.31 | 27.7 | 6340 | 10530 |
| Example 2 | Powdery activated carbon C | 0.535 | 0.23 | 0.46 | 19.5 | >50,600 | 13440 |
| Comparative Example 4 | Powdery activated carbon D | 0.398 | 0.39 | 0.65 | 36.5 | >53,030 | 6150 |
| Example 3 | Powdery activated carbon A | 0.403 | 0.36 | 0.31 | 27.5 | >51,350 | 8100 |
| Example 4 | Powdery activated carbon E | 0.449 | 0.38 | 0.92 | 26.6 | >50,460 | 8960 |
| Example 5 | Powdery activated carbon E | 0.509 | 0.45 | 1.85 | 26.6 | 37380 | 10860 |
| Example 6 | Powdery activated carbon F | 0.436 | 0.58 | 1.44 | 25.1 | 25570 | 9390 |

TABLE 2-continued

| | Activated carbon | Physical properties of adsorption filter | | | | Performance of adsorption filter | |
|---|---|---|---|---|---|---|---|
| | | | Mercury porosimetry | | | Clogging performance | Harmful substance removal performance |
| | | Density (g/ml) | Pore volume at diameter of 1 to 20 μm (ml/g) | Small pore volume/large pore volume | Benzene adsorption performance (%) | Accumulated water-passing amount when flow rate is 50% (L) | Accumulated water-passing amount when removal rate is 80% (L) |
| Comparative Example 5 | Powdery activated carbon F | 0.499 | 0.67 | 3.56 | 25.4 | 17590 | 11360 |
| Example 7 | Powdery activated carbon G | 0.424 | 0.34 | 0.56 | 31.0 | 62130 | 8010 |

(Discussion)

As shown in Table 2, the adsorption filter of the present embodiment exhibited extremely excellent clogging performance while maintaining harmful substance removal performance.

In contrast, the adsorption filter of Comparative Example had poor harmful substance removal performance or clogging performance.

From the above, it could be confirmed that the adsorption filter of the present invention can achieve both clogging performance and harmful substance removal performance.

This application is based on Japanese Patent Application No. 2017-254354 filed on Dec. 28, 2017, the contents of which are included in the present application.

The present invention has been appropriately and sufficiently explained above by way of the embodiments while referring to the specific examples described above, for the purpose of illustrating the invention. A person skilled in the art should recognize, however, that the embodiments described above can be easily modified and/or improved. Therefore, it is understood that any modified embodiments or improved embodiments conducted by a person skilled in the art are encompassed within the scope as claimed in the appended claims, so long as these modifications and improvements do not depart from the scope of the claims.

INDUSTRIAL APPLICABILITY

The present invention has wide industrial applicability in the technical fields related to an adsorption filter, water purification, and the like.

The invention claimed is:

1. An adsorption filter comprising an activated carbon and a fibrous binder, wherein the adsorption filter has a density of 0.400 g/ml or more, and a pore volume at a pore diameter of 1 to 20 μm is 0.10 ml/g or more and 0.60 ml/g or less as measured by mercury intrusion porosimetry.

2. The adsorption filter according to claim 1, wherein, when air containing solvent vapor having a concentration of 1/10 of a solvent saturation concentration is caused to pass through the adsorption filter at 25° C., and a mass is constant, a benzene saturation adsorption amount obtained from a weight increase of a sample is 18 to 35%.

3. The adsorption filter according to claim 1, wherein a ratio of a pore volume at a pore diameter of 1 to 20 μm as measured by mercury intrusion porosimetry to the pore volume at a pore diameter of 30 μm or more as measured by mercury intrusion porosimetry (the pore volume at a pore diameter of 1 to 20 μm/the pore volume at a pore diameter of 30 μm or more) is 0.1 to 1.5.

4. The adsorption filter according to claim 1, wherein said adsorption filter has a density of 0.550 g/ml or less.

5. The adsorption filter according to claim 1, wherein a fibrous binder content is 4-10 parts by mass based on 100 parts by mass of said activated carbon.

6. The adsorption filter according to claim 1, wherein said fibrous binder is at least one fiber selected from the group consisting of an acrylic fiber, a polyethylene fiber, a polypropylene fiber, a polyacrylonitrile fiber, a cellulose fiber, a nylon fiber, an aramid fiber, and a pulp.

7. The adsorption filter according to claim 1, wherein a water-passing property of said fibrous polymer binder is about 10 to 150 mL in terms of CSF value.

* * * * *